July 3, 1934.  F. E. HARTMAN  1,965,187
PURIFICATION OF AIR
Filed Sept. 15, 1930
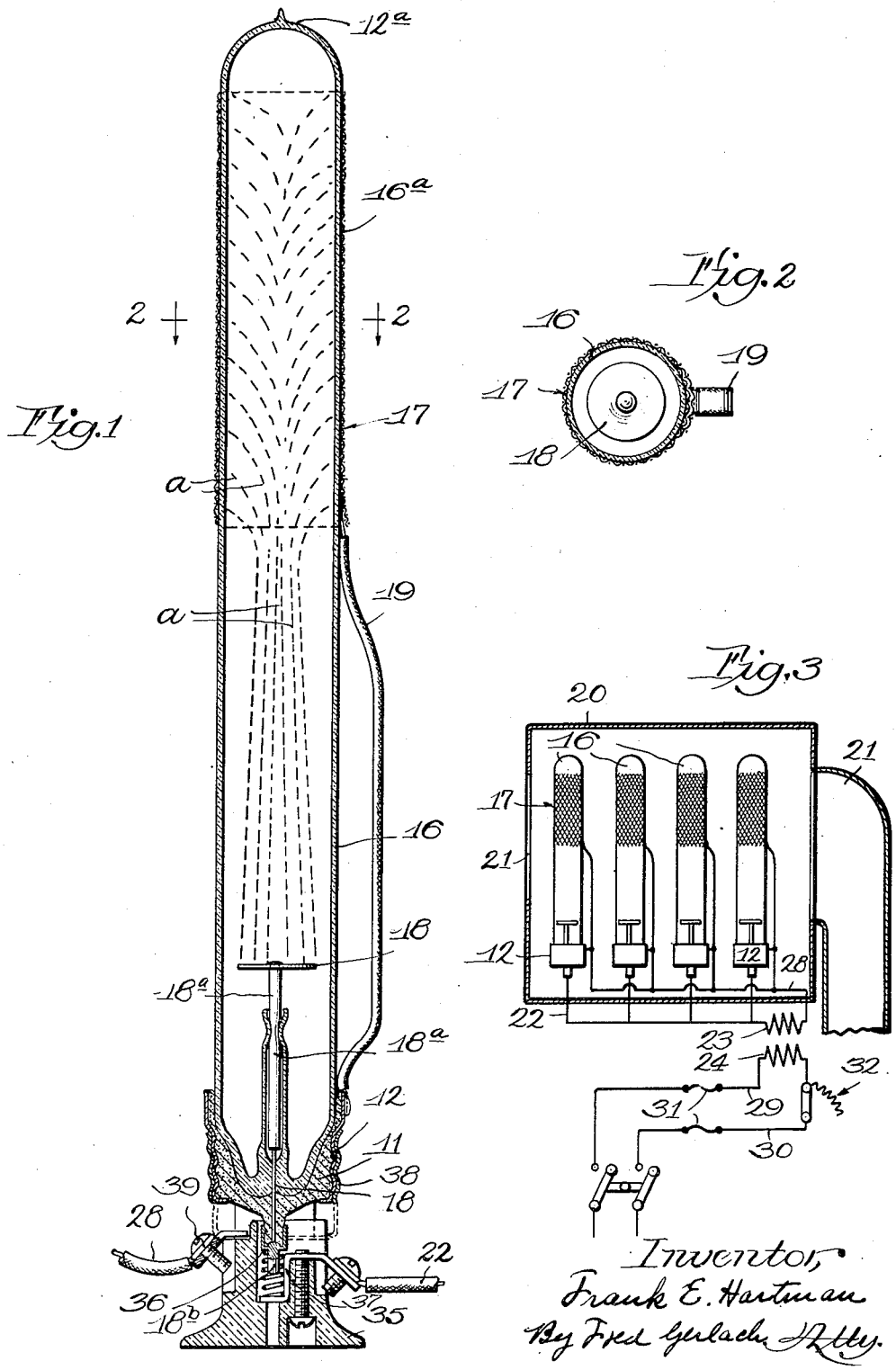
Inventor,
Frank E. Hartman
By Fred Gerlach Atty.

Patented July 3, 1934

1,965,187

UNITED STATES PATENT OFFICE 1,965,187

PURIFICATION OF AIR

Frank E. Hartman, Chicago, Ill., assignor of one-third to Fred H. Montgomery and one-third to W. Ray Montgomery, both of Chicago, Ill.

Application September 15, 1930, Serial No. 481,848

4 Claims. (Cl. 204—32)

The invention relates to the purification of air.

Ozone has been frequently used for the purpose of purifying air, but ozone itself is possessed of a sharp and penetrating odor and this renders it necessary carefully to control the quantity of ozone introduced with respect to the amount of odoriferous gases to be oxidized. This becomes increasingly difficult where the occupancy of the ventilated space is subject to variation in the number of people or operations which may tend to produce odor of a type that is susceptible to rapid atmospheric oxidation. For these reasons, ozone has been only limitedly successful in the deodorization of air in the treatment of air and has found its widest application in the deodorization of exhaust supplies in order to avoid nuisances in the neighborhood of exhaust outlets.

In gaseous discharge tubes of the "Geissler" type heretofore used in the purification of air, both electrodes are located inside of the tube which is evacuated to some desired absolute pressure. The discharge takes place wholly within the tube and the phenomena is essentially concerned with the effect of the discharge through the residual gases in the tube.

The Telsa discharge tube, also used heretofore in the purification of air, is analagous to the conventional ozone generator. Generally an electrode is placed on the inside of a tube of dielectric material with a second electrode outside of and spaced from the tube to produce a discharge between the tube and the outer electrode.

In practice it has been found that all such methods of air activation have depended primarily on the ozone produced for the beneficial results obtained.

I have found in practice that by subjecting the air to an irradiation by ultra-violet rays produced in the glow discharge in a tube and the corona discharge outside of the tube, the combined forces increase the number of gaseous ions in the air about the tube and further produce molecules that are in a state of radiation. The ionization and excitation of the molecules are the combined result of the effect of absorption of light quanta by the atomic electrons composing the molecular system together with collisions produced by the attraction of ions, due to the field of corona discharge. Under the intense attraction produced by this field, the gaseous ions travel through the air with considerable kinetic energy and no longer indulge in elastic impacts, such as ordinarily result from the thermal agitation of air, but rather crash through adjacent molecular systems, and in doing so, bombard the adjacent molecules in a manner that serves both to activate and ionize them. It has been further found from experiments that the oxygen of the air thus treated is rendered extremely chemically active so that it will quickly attract low oxidized odoriferous gases and render them non-odoriferous. It further imparts to the air a quality that is recognized by the sense impressions as being fresh and zestful, qualities which are highly desirable in the air from a ventilating system and are conducive to comfort.

One object of the invention is to provide a method and apparatus for subjecting the air to irradiation and ionization to produce this result.

This object is attained primarily by the use of an evacuated tube which contains a positive electrode remotely placed from an exterior electrode on the tube, and providing a tube of transmission glass with a transmission factor that reaches to the near ultra-violet to produce irradiation which will disturb the normal equilibrium of the molecules in such a manner that it is further enhanced by the action of the corona discharge produced on the outside of the tube so that the sum of the forces of irradiation from the ultra-violet light and the corona discharge about the tube will effect the desired purification of the air.

Another object is to provide a simple and efficient tube for this purpose.

The invention consists in the several novel features hereinafter set forth and more particularly defined by claims at the conclusion hereof.

In the drawing: Fig. 1 is a longitudinal section of a tube embodying the invention. Fig. 2 is a section on line 2—2 of Fig. 1. Fig. 3 is a diagram of a purifying system embodying the invention.

The improved tube comprises a conventional lamp-type base with a screw-shell 12 adapted to be retained in a suitable socket, and an evacuated glass-tube 16 held by a suitable filling 11 of cement in the shell 12. An electrode 18, preferably of aluminum and in the form of a disk, is secured to a conductor rod $18^a$ which passes through and is fused in the lower end of the glass tube, and a contact $18^b$ outside of the tube is electrically connected to said rod. This tube is adapted to be secured in a socket which comprises a porcelain base 35, a spring contact 36 connected to a terminal 37 and for engaging contact 18b on the tube, and a screw-shell 38 electrically connected to a terminal 39 in the base, and for contacting with the screw-contact 12 on the tube.

The tube is evacuated to the highest possible degree with a mercury diffusion pump and later argon, helium or other suitable gases are admitted to the tube until the inner pressure of the tube approximates 1 bar. The tube is sealed off, as shown at 12a after the electrode 18 has been mounted therein. The purpose of the introduction of the rare gases is to provide sufficient residual gas to permit the internal atmosphere to become electrically conductive and the pressure sufficient to prevent an electrical clean-up or hardening of the tube upon prolonged operation. In the selection of the gas to be used, it is desirable that its emission under the influence of the discharge be rich in light in the near ultra-violet region of the spectrum.

The outside of the tube is provided with an electrode which consists of a tubular metallic mesh screen 17 which fits the outer wall of the tube tightly with substantially no air gap between the screen and the wall of the tube. The screen is electrically connected to the screw-base 12 which constitutes the outer contact of the tube and is insulated from the dielectric 16, by a conductor strip 19 which is wrapped with insulating material. The sleeve 17 does not encase the entire tube, but terminates at a point which is longitudinally distant from the electrode 18 and extends over approximately one-half of the glass tube, so that the distance between the plane of inner electrode 18 and the nearest end of the outside electrode 17 is about equivalent to the length of the screen. When the tube is energized with the proper potential energy, for example 5000 volts, there is a passage of electric current from the inner electrode 18 to and about the outer screen 17. This produces a glow discharge inside of the tube, as indicated by the lines $a$—$a$. This discharge, being rich in near ultra-violet radiations, which, according to the laws of propagation of light, radiate out through the unenclosed portion of the tube 16 below screen 17. The glass tube is made of transmission glass, such as a vitreous or glassing material that will transmit light in the near ultra violet down to as low as $\lambda$ 280 $\mu\mu$, having a coefficient of transmission of at least 30% of the incident light of this wave length and a co-efficient of transmission of not less than 75% of the incident light of a wave length of $\lambda$ 290 $\mu\mu$ with approximately 100% transmission at $\lambda$ 300 $\mu\mu$, and wholly transparent to all light above $\lambda$ 300 $\mu\mu$. A corona discharge takes place on or about the screen 17. This discharge is such as to cause practically no production of ozone. When air is circulated around and about the tube thus energized, it is simultaneously subjected to an irradiation with the ultra-violet light produced in the glow discharge and to the influence of the corona discharge which takes place about the screen 17.

Fig. 3 illustrates the invention applied to a ventilating apparatus comprising a series of tubes, placed in a cabinet 20, through which air is forced by a fan which draws air through the cabinet and around the tubes to an exhaust duct 21. The electrodes 18 are electrically connected when the tubes are in their sockets through contacts 18b, 36 to a conductor 22 leading from the secondary winding 23 of a transformer with a primary winding 24 to terminals 37 in the tube sockets. The electrodes 17 are electrically connected through strips 19, screw-contacts 12, 38, to a conductor 28 which leads from terminals 39 to the other end of winding 23. The primary coil 24 is connected to a suitable source of alternating current through conductors 29, 30, in which a fuse 31, a rheostat 32, and switch are included. The rheostat is provided to control the intensity of the action of the tubes by controlling the potential of the current supplied to them. A high potential, usually 5000 volts, is supplied to conductors 28, 29. This potential may be varied according to the thickness of the glass tube and the capacity in reactance of the units.

When the tubes are energized, and the air circulated through the cabinet and around the tubes, ultra violet rays will be produced in the glow discharge from the electrodes 18 between these electrodes and that portion of the tubes surrounded by the screen-electrodes 17, and this subjects the air to irradiation by the ultra violet rays between the electrodes. A corona discharge is produced around the screen and outside of the glass dielectric, and the air also comes under the influence of this discharge. These forces combine to increase the number of gaseous ions in the air and to produce molecules that are in a state of radiation. Under the intense attraction produced in the fields of screen-electrodes 17, the gaseous ions travel through the air with considerable kinetic energy and no longer indulge in elastic impacts, such as ordinarily result from thermal agitation of air, but rather crash through adjacent molecular systems, and in doing so bombard the adjacent molecules in a manner that serves to both activate and ionize them. The oxygen of the air thus treated is rendered extremely chemically active, so that it will quickly attack low oxidation odoriferous gases and render them non-odoriferous.

Mechanical ventilation systems usually draw in air at one point and pass same through filters, for the removal of dust and other matter. In some cases the air after filtration is passed through humidifying apparatus for the purpose of producing a definite moisture content in the air, subsequently across heating surfaces, and is finally delivered to the various spaces to be ventilated. This processing of the air frequently produces a condition that is generally designated by those familiar with the art as "flat" or "stale". The invention relieves this condition of flatness or staleness, and in addition produces a chemically active state in the oxygen of the air that will predispose it to immediate chemical reactions with odoriferous gases, either drawn in from the source of supply and not removed during the processing, or, as is frequently the case, odoriferous emanations arising from the occupants of the ventilated spaces. This relief is particularly desirable where the air of a ventilation system is recirculated, both for the conservation of heat in winter, or, where air is cooled, the conservation of refrigeration, and this invention maintains a pure fresh air condition where such recirculation is practiced.

The invention exemplifies a method of and apparatus for purifying air through a corona discharge by ionization and irradiation from ultra violet rays; in which the corona discharge is produced by a perforated sleeve around and contacting with a glass tube of transmission glass; and by which the molecules of the air are activated without the production of ozone and the resultant sharp and penetrating odor.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination of a dielectric tube of light transmission glass, a disk forming an electrode in one end of the tube, an electrode contacting with and surrounding the outside of the other end of the tube, for producing a corona discharge outside of the tube, said outer electrode being spaced from the inner electrode so that the central portion of the tube is exposed and so that during actuation of the tube a glow discharge is produced in the tube between the electrodes for light irradiation of the air in the field surrounding the portion of the exposed central tube between the electrodes, and means for supplying high potential current to the electrodes.

2. The combination of a dielectric tube of light transmission glass, an electrode in one end of the tube, a tubular screen forming an electrode around the outside of the other end of the tube and operative to produce a corona discharge outside of the tube, said screen electrode being spaced from the inner electrode so that the central portion of the tube is exposed and so that during actuation of the tube a glow discharge is produced in the tube between the electrodes for light irradiation of the air in the field surrounding the exposed central portion of the tube between the electrodes, and means for supplying high potential current to the electrodes.

3. The combination of a dielectric tube of light transmission glass, a disk forming an electrode in one end of the tube, a tubular screen forming an electrode around the outside of the other end of the tube and operative to produce a corona discharge outside of the tube, said screen being spaced from the inner electrode so that the central portion of the tube is exposed and so that during actuation of the tube from the inner electrode to produce a glow discharge is produced in the tube between the electrodes for light irradiation of the air in the field surrounding the portion of the tube between the electrodes, and means for supplying high potential current to the electrodes.

4. The combination of a dielectric tube of light transmission glass, filled with electrically conductive gas and provided with a tip-contact and a sleeve-contact at one end thereof, an electrode disposed in one end of the tube and connected to the tip contact, a perforate tubular electrode for producing a corona discharge outside of the tube, extending around the outside of the other end of the tube and spaced from the inner electrode so that the central portion of the tube is exposed and permits the glow discharge resulting between the two electrodes when the tube is actuated to radiate through it into the surrounding air, and an insulated conductor between the outer electrode and the sleeve-contact.

FRANK E. HARTMAN.